(12) United States Patent
Higashida et al.

(10) Patent No.: US 11,868,076 B2
(45) Date of Patent: Jan. 9, 2024

(54) LUBRICANT COATING WITH REDUCED LUBRICANT REMNANT

(71) Applicant: HEWLETT-PACKARD DEVELOPMENT COMPANY, L.P., Spring, TX (US)

(72) Inventors: Katsushi Higashida, Yokohama (JP); Takeshi Uchitani, Yokohama (JP); Takayuki Wakai, Yokohama (JP)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/925,375

(22) PCT Filed: May 19, 2021

(86) PCT No.: PCT/US2021/033063
§ 371 (c)(1),
(2) Date: Nov. 15, 2022

(87) PCT Pub. No.: WO2021/247239
PCT Pub. Date: Dec. 9, 2021

(65) Prior Publication Data
US 2023/0195027 A1 Jun. 22, 2023

(30) Foreign Application Priority Data
Jun. 4, 2020 (JP) .................. 2020-097402

(51) Int. Cl.
*G03G 21/00* (2006.01)
*F16N 15/00* (2006.01)
(Continued)

(52) U.S. Cl.
CPC ......... *G03G 21/0094* (2013.01); *F16N 15/00* (2013.01); *F16N 29/02* (2013.01);
(Continued)

(58) Field of Classification Search
CPC ........... G03G 21/0094; G03G 15/2025; G03G 15/161; G03G 15/0225; G03G 21/0005;
(Continued)

(56) References Cited

U.S. PATENT DOCUMENTS

| 3,701,335 A | 10/1972 | Barnscheidt |
| 9,436,152 B2 | 9/2016 | Honjoh et al. |

(Continued)

FOREIGN PATENT DOCUMENTS

| JP | 2006-091037 A | 4/2006 |
| JP | 2010-282188 A | 12/2010 |

(Continued)

*Primary Examiner* — Arlene Heredia
*Assistant Examiner* — Laura Roth
(74) *Attorney, Agent, or Firm* — Foley & Lardner LLP

(57) ABSTRACT

An example lubricant coating device includes a rotatable applicator to apply lubricant from a solid lubricant source to a member to be coated, and a supporting device to support the solid lubricant source in a contact state with the rotatable applicator. The supporting device changes a supporting angle of the solid lubricant source relative to the rotatable applicator when a consumption of the solid lubricant source reaches a consumption threshold.

17 Claims, 13 Drawing Sheets

(51) Int. Cl.
*F16N 29/02* (2006.01)
*G03G 15/02* (2006.01)

(52) U.S. Cl.
CPC ....... *G03G 21/007* (2013.01); *G03G 15/0225* (2013.01); *G03G 21/0035* (2013.01)

(58) Field of Classification Search
CPC ........... G03G 21/0035; G03G 21/0058; G03G 21/007; F16N 15/00; F16N 29/02
See application file for complete search history.

(56) References Cited

U.S. PATENT DOCUMENTS

| | | |
|---|---|---|
| 2004/0037586 A1 | 2/2004 | Lyu et al. |
| 2007/0068738 A1* | 3/2007 | Kawahara .......... G03G 21/0005 184/99 |
| 2007/0231029 A1* | 10/2007 | Konno ................ G03G 21/007 399/346 |
| 2010/0067949 A1* | 3/2010 | Watanabe ............ G03G 21/007 399/123 |
| 2011/0044737 A1 | 2/2011 | Takada |
| 2011/0143024 A1 | 6/2011 | Nakane et al. |
| 2011/0229232 A1* | 9/2011 | Kojima .............. G03G 21/0094 399/346 |
| 2011/0274474 A1 | 11/2011 | Arai et al. |
| 2018/0143580 A1* | 5/2018 | Aoki ................... G03G 15/161 |

FOREIGN PATENT DOCUMENTS

| | | |
|---|---|---|
| JP | 2017-009988 A | 1/2017 |
| JP | 2018-017912 A | 2/2018 |

* cited by examiner

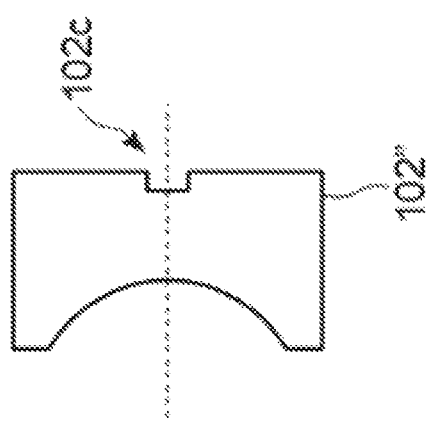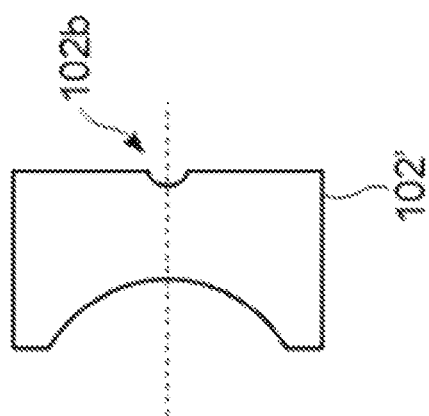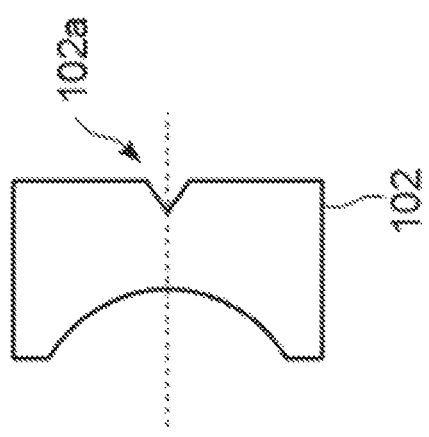

LUBRICANT COATING WITH REDUCED LUBRICANT REMNANT

BACKGROUND

A basic operation of an imaging apparatus of an electrophotographic system includes transferring toner to an image carrier on which a latent image is formed, transferring the toner to paper, and fixing, to the paper, the toner transferred onto the paper. The image carrier corresponds to a photosensitive drum, an intermediate transfer belt or the like. For protection of, and reduction in friction on the image carrier, lubricant is applied to a surface of the image carrier. A device to apply the lubricant may be referred to as a lubricant coating device. When the lubricant is consumed, the lubricant coating device or a unit including the lubricant coating device is to be replaced.

BRIEF DESCRIPTION OF DRAWINGS

FIG. 5A is a cross-sectional view of a solid lubricant source according to an example.

FIG. 5B is a cross-sectional view of a solid lubricant source according to another example.

FIG. 5C is a cross-sectional view of a solid lubricant source according to another example.

DETAILED DESCRIPTION

Figure 1:
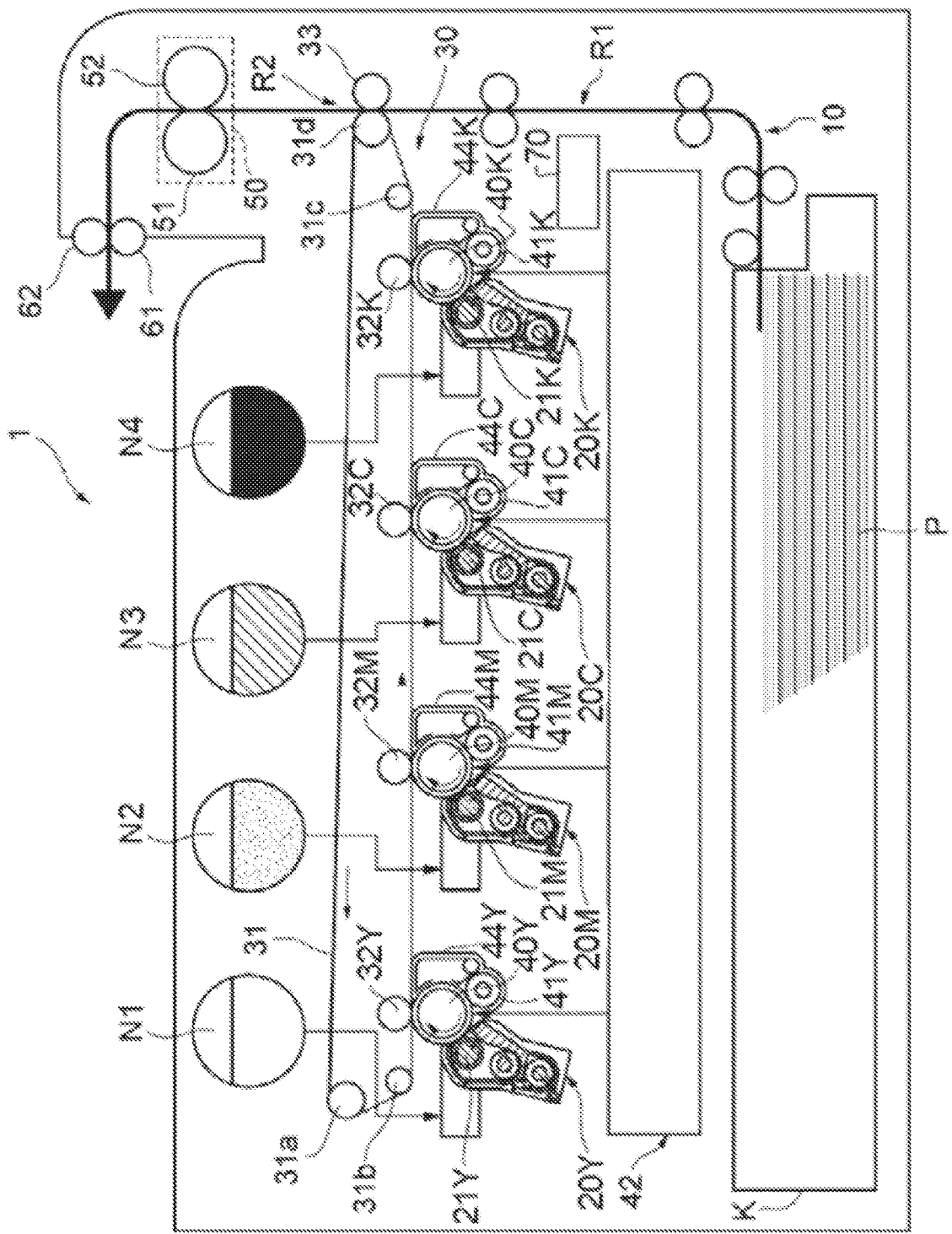
FIG. 1 is a schematic diagram of an example imaging apparatus.

The present disclosure will be best understood from the following detailed description when it is read together with the accompanying drawings. The same or similar reference numerals in different drawings denote the same or similar feature elements, and redundant explanations related to such feature elements are omitted. The terms "above," "below," "right" and "left" indicate the directions in drawings when viewed from the front and are not always identical to directions at the time of actual use of a device. The feature elements are not always drawn to scale and sometimes, a portion thereof is emphasized in order to illustrate operation, effect and the like of the present disclosure.

An example lubricant coating device may include a rotatable applicator to apply lubricant from a solid lubricant source to a member to be coated, and a supporting member to support the solid lubricant source in a contact state with the rotatable applicator and to change a supporting angle of the solid lubricant source relative to the rotatable applicator in response to consumption of the solid lubricant source to a consumption threshold. With such a lubricant coating device, a remnant (remainder) of unscraped lubricant can be reduced to reduce waste. Thus, for a same size of lubricant source, the life of the lubricant coating device or a unit including the lubricant coating device can be prolonged. In addition, when the lubricant coating device or the unit including the lubricant coating device is designed to have a life as long as that of a counterpart currently available, the lubricant source can be downsized and the lubricant coating device or the unit including the lubricant coating device can be downsized accordingly.

With reference to FIG. 1, a schematic configuration of an example imaging apparatus 1 will be described. The imaging apparatus 1 can be an apparatus which forms a color image using toners of the colors yellow, magenta, cyan and black. The imaging apparatus 1 can be provided with a recording medium conveyance device 10 conveying paper P, developing devices 20Y, 20M, 20C and 20K developing an electrostatic latent image, a transfer unit 30 secondarily transferring a toner image to the paper P, photosensitive drums 40Y, 40M, 40C and 40K which are electrostatic latent image carriers on the circumferential surfaces of which the image is formed, and a fixing unit 50 fixing the toner image to the paper P. Y, M, C and K following the respective reference numerals indicate that the components are associated with the colors of yellow, magenta, cyan and black, respectively. In the present description, when the components do not need to be distinguished by color, Y, M, C and K following the respective reference numerals may be omitted for simplification and they may be referred to as the developing device 20 and the photosensitive drum 40. Similarly, also for a developing roller 21, a primary transfer roller 32, a charging roller 41 and a cleaning unit 44 described later, Y, M, C and K following the respective reference numerals may be omitted.

The recording medium conveyance unit 10 can convey, on a conveyance path R1, the paper P as a recording medium on which the image is formed. The paper P may be stacked and stored in a cassette K. The recording medium conveyance unit 10 can convey the paper P to reach a secondary transfer region R2 through the conveyance path R1 at a timing when the toner image to be transferred to the paper P reaches the secondary transfer region R2.

Four developing devices 20 may be provided, one for each of the colors. Each developing device 20 can be provided with the developing roller 21 allowing toner to be carried on the photosensitive drum 40. The developing device 20 may adjust the toner and carrier to be at a targeted mixing ratio and further mix and stir them to uniformly disperse the toner, thereby adjusting a developer to which an optimal charge amount is given. This developer is made to be carried on the developing roller 21. Further, as the developing roller 21 rotates, the developer is conveyed to a region facing the photosensitive drum 40, where the toner of the developer carried on the developing roller 21 moves to the electrostatic latent image formed on the circumferential surface of the photosensitive drum 40, so as to develop the electrostatic latent image.

The transfer unit 30 can convey the toner image formed in the developing device 20 to the secondary transfer region R2 in which the toner image is secondarily transferred to the paper P. The transfer unit 30 can be provided with a transfer belt 31, suspension rollers 31a, 31b, 31c and 31d suspending (or supporting) the transfer belt 31, the primary transfer rollers 32 arranged to position the transfer belt 31 between the primary transfer rollers 32 and the photosensitive drums 40, and a secondary transfer roller 33 located to position the transfer belt 31 between the secondary transfer roller 33 and the suspension roller 31d.

The transfer belt 31 can be an endless belt that is rotated by the suspension rollers 31a, 31b, 31c and 31d. The primary transfer rollers 32 may be disposed to press against the photosensitive drums 40 from the inner circumferential side of the transfer belt 31. The secondary transfer roller 33 may be disposed to press against the suspension roller 31d from the outer circumferential side of the transfer belt 31.

Four photosensitive drums 40 may be provided, one for each of the colors. The respective photosensitive drums 40 may be disposed along a moving direction of the transfer belt 31. On the circumference of the photosensitive drum 40, the developing device 20, the charging roller 41, an exposure unit 42, the cleaning unit 44 and the like may be provided.

The charging roller 41 causes the surface of the photosensitive drum 40 to be uniformly charged at a predetermined potential. The charging roller 41 can rotate so as to follow a rotation of the photosensitive drum 40. The exposure unit 42 changes the potential in a portion of the surface of the photosensitive drum 40 so as to form the electrostatic latent image according to the image to be formed on the paper P. The developing devices 20 develop the electrostatic latent images on the photosensitive drums 40 with toner supplied from toner tanks N1 to N4 disposed adjacent the respective developing devices 20, to generate respective toner images. The toner tanks N1 to N4 is each filled with yellow, magenta, cyan or black toners, respectively. The cleaning unit 44 collects residual toner on the photosensitive drum 40 after the toner image on the photosensitive drum 40 is primarily transferred to the transfer belt 31. In one example, the photosensitive drum 40 and the charging roller 41 are mounted to a housing forming the cleaning unit 44. That is, the cleaning unit 44, the photosensitive drum 40 and the charging roller 41 are formed into a unit.

The fixing unit 50 can allow the toner image secondarily transferred from the transfer belt 31 to adhere to the paper P to be fixed thereon. The fixing unit 50 may be provided with a heater roller 51 heating the paper P and a pressure roller 52 pressing the heater roller 51. The heater roller 51 and the pressure roller 52 are each formed in a cylindrical shape and the heater roller 51 may be provided inside with a heat source such as a halogen lamp or the like. A fixing nip, which is a contact region, is provided between the heater roller 51 and the pressure roller 52, and the toner image can be fused and fixed to the paper P by allowing the paper P to pass through the fixing nip.

In addition, the imaging apparatus 1 may be provided with discharge rollers 61 and 62 to discharge, to the outside of the apparatus, the paper P onto which the toner image is fixed by the fixing unit 50.

A printing process carried out by the imaging apparatus 1 will be described. In a charging operation, when an image signal of an image to be recorded is input to the imaging apparatus 1, a controller 70 of the imaging apparatus 1 causes, based on the received image signal, the charging roller 41 to uniformly charge the surface of the photosensitive drum 40 at a predetermined potential. In an exposing operation, the exposure unit 42 exposes a laser light to the surface of the photosensitive drum 40 to form an electrostatic latent image.

Each developing device 20 develops the electrostatic latent image to form a toner image, as part of a developing operation. The toner image formed in this manner is primarily transferred from the photosensitive drum 40 to the transfer belt 31 in a region where the photosensitive drum 40 faces the transfer belt 31, as part of a transferring operation. On the transfer belt 31, the toner images formed on the four photosensitive drums 40 may be overlaid or layered one after another to form a single composite toner image. Then, the composite toner image may be secondarily transferred to the paper P conveyed from the recording medium conveyance unit 10 in the secondary transfer region R2 where the suspension roller 31d faces the secondary transfer roller 33.

The paper P to which the composite toner image is secondarily transferred may be conveyed to the fixing unit 50. In a fixing operation, the composite toner image is fused and fixed to the paper P by allowing the paper P to pass through the portion between the heater roller 51 and the pressure roller 52 while applying heat and pressure thereto. Subsequently, the paper P may be discharged to the outside of the imaging apparatus 1 through the discharge rollers 61 and 62.

The aforementioned operations of the imaging apparatus 1 and the like may be controlled by the controller 70. The controller 70 may be implemented in the form of a processor such as a central processing unit that executes machine readable instructions. The machine readable instruction can be stored in any suitable computer readable medium.

Figure 2:
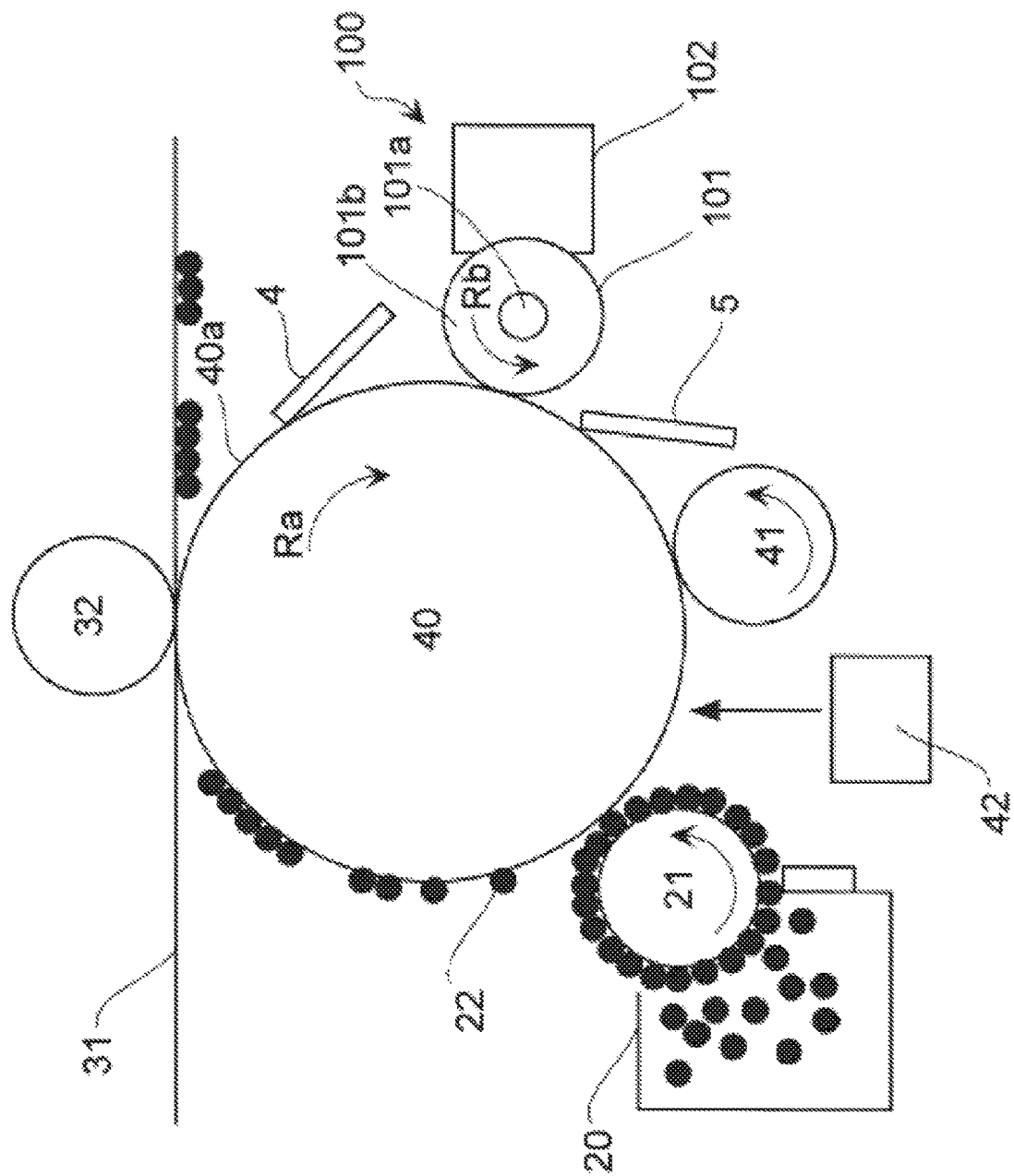
FIG. 2 is a schematic cross-sectional view of a photosensitive drum and its vicinity in an example imaging apparatus.

FIG. 2 is a diagram schematically illustrating the photosensitive drum (also referred to as an image carrier or a member to be coated) 40 and its vicinity in the example imaging apparatus 1 shown in FIG. 1. FIG. 2 shows a toner image being formed on the transfer belt 31, from toner 22.

As shown in FIG. 2, the imaging apparatus 1 according to an example includes the primary transfer roller 32, a cleaning blade 4, a lubricant coating device 100, a blade 5, the charging roller 41, the exposure unit 42, the developing device 20 and the like along a rotating direction Ra of the photosensitive drum 40. The charging roller 41 and the exposure unit 42 have been described above.

The cleaning blade 4 which can be a portion of the cleaning unit 44 can collect toner (transfer residual toner) that remains on the photosensitive drum 40 even after the toner image is primarily transferred from the photosensitive drum 40 to the transfer belt 31. The cleaning blade 4 may be formed of an elastic body such as, for example, urethane rubber. The cleaning blade 4 is configured to be pressed against the surface of the photosensitive drum 40 and is capable of scraping off the transfer residual toner from the surface of the photosensitive drum 40.

The example lubricant coating device 100 can apply lubricant to the surface of the image carrier (e.g., the photosensitive drum 40) for protection of, and reduction in friction on the image carrier. The lubricant coating device 100 includes a supply roller (also referred to as an applicator or rotatable applicator) 101 disposed on the circumference of the photosensitive drum 40 and a solid lubricant source 102. The supply roller 101 is located between the cleaning blade 4 and the blade 5 on the circumference of the photosensitive drum. In one example, the lubricant coating device 100 may be disposed in the imaging apparatus 1 so as to be replaceable as a single unit. In another example, the supply roller 101, the lubricant source 102, the blade 5 and the like may be mounted to a housing forming the cleaning unit 44.

The blade 5 may be provided in order to uniformly layer fine particles of the lubricant applied to the surface of the photosensitive drum 40. The blade 5 may be formed of an elastic body such as, for example, urethane rubber. The blade 5 is configured to be pressed against the surface of the photosensitive drum 40. In another example, the blade 5 can also serve as a cleaning blade, and in that case, the cleaning blade 4 may be omitted.

Figure 3A:
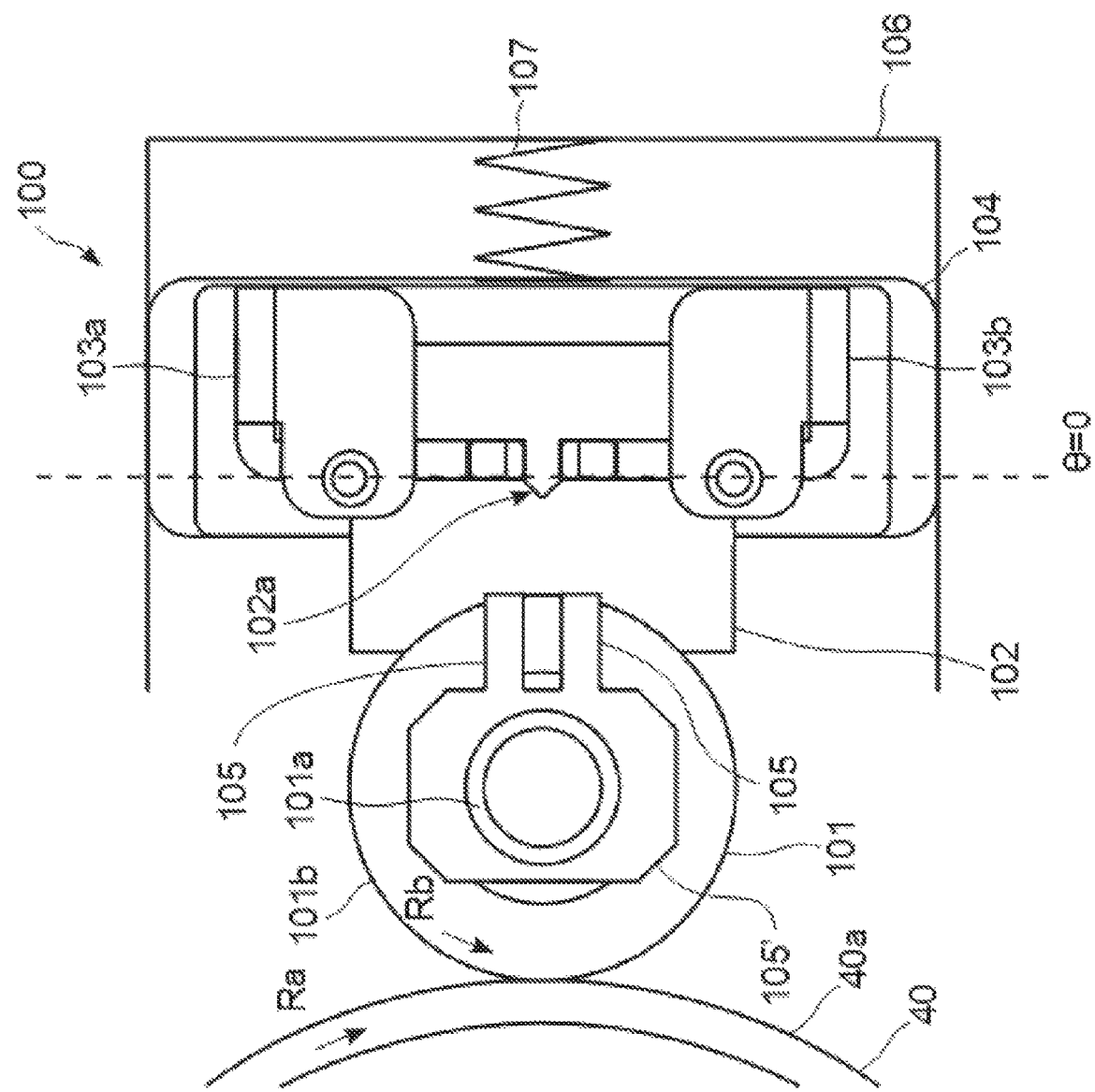
FIG. 3A is a schematic side view of an example lubricant coating device, illustrating an example state before lubricant is consumed.
Figure 3B:
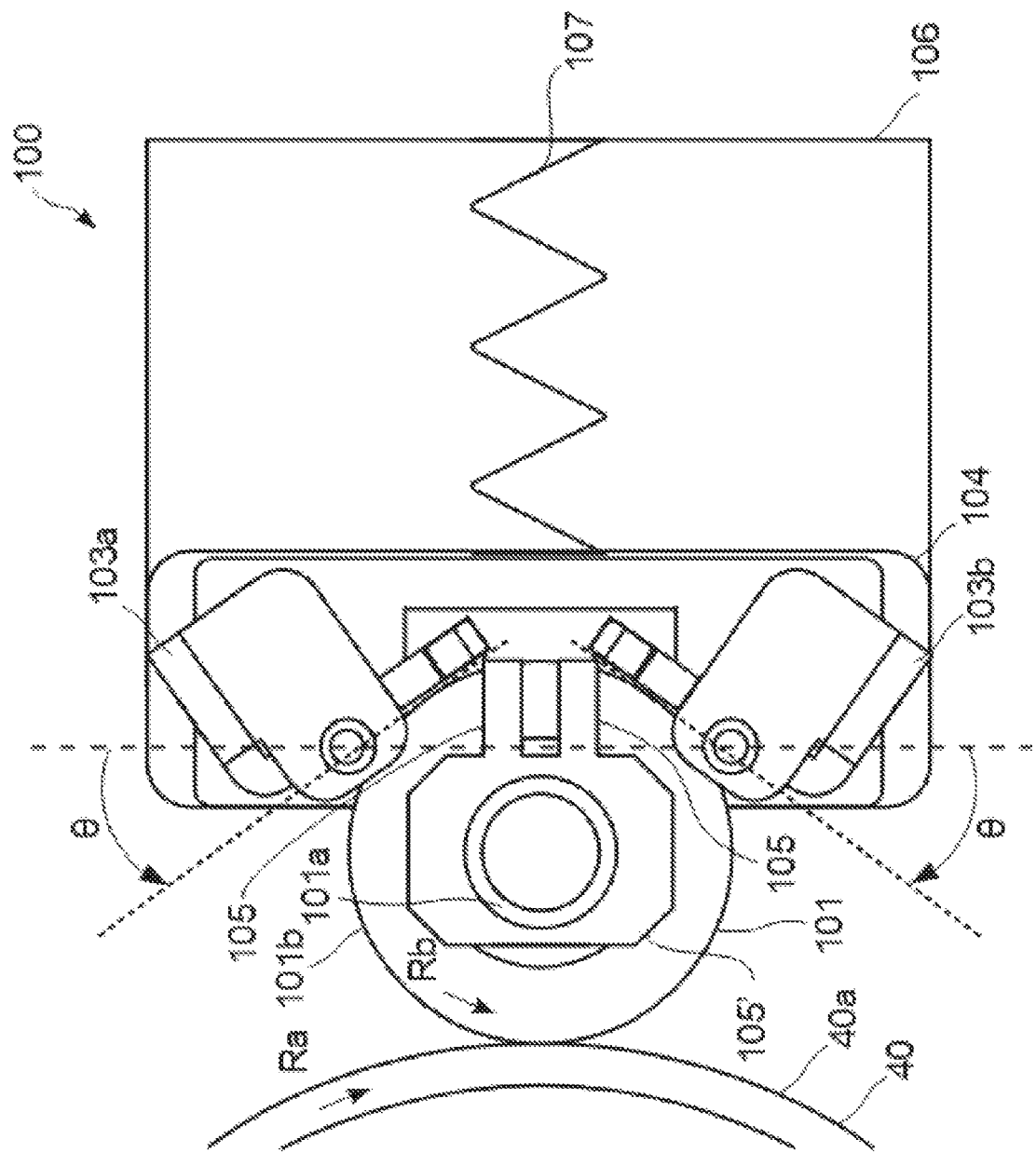
FIG. 3B is a schematic side view of the example lubricant coating device illustrating an example state after the lubricant is consumed.
Figure 4A:
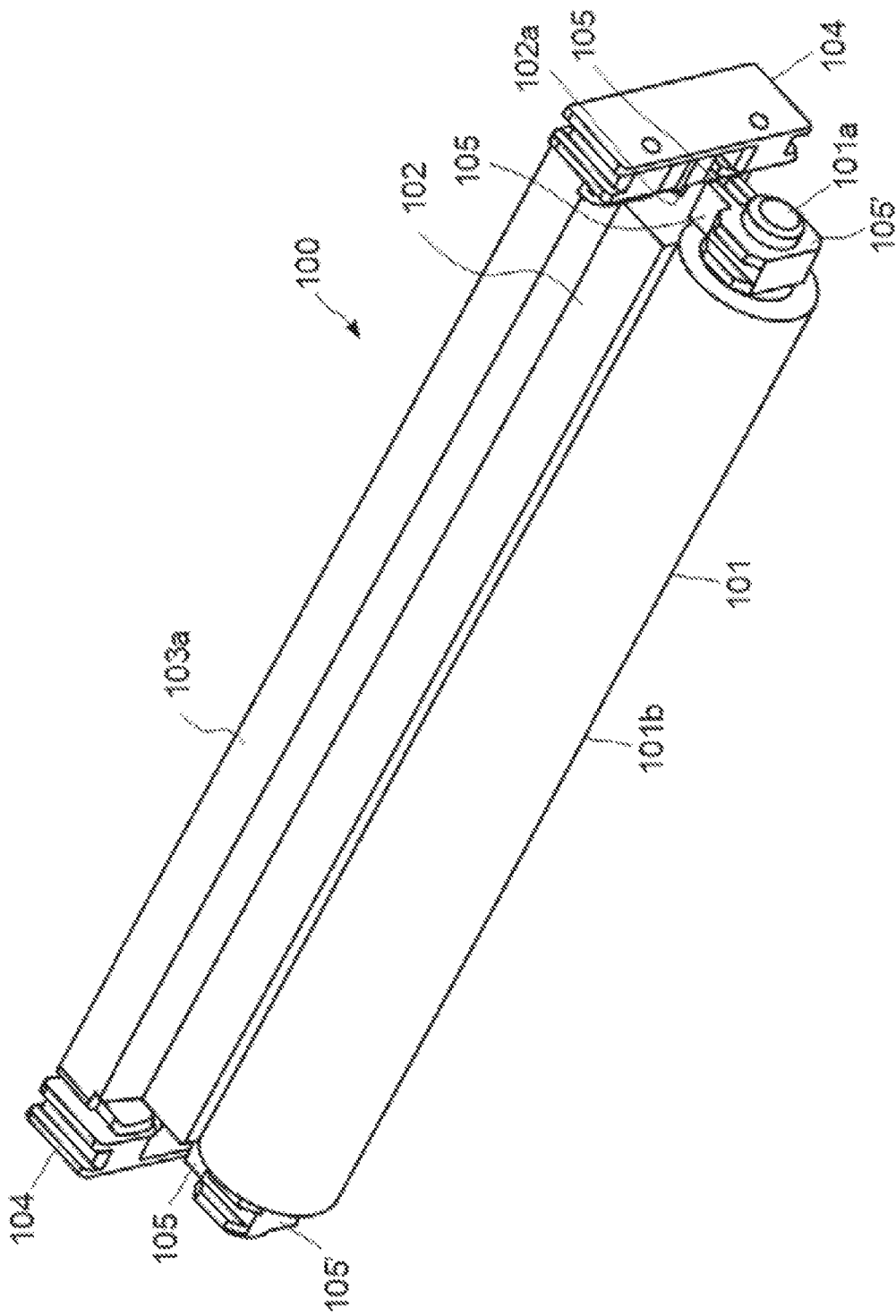
FIG. 4A is a schematic perspective view of the example lubricant coating device.
Figure 4B:
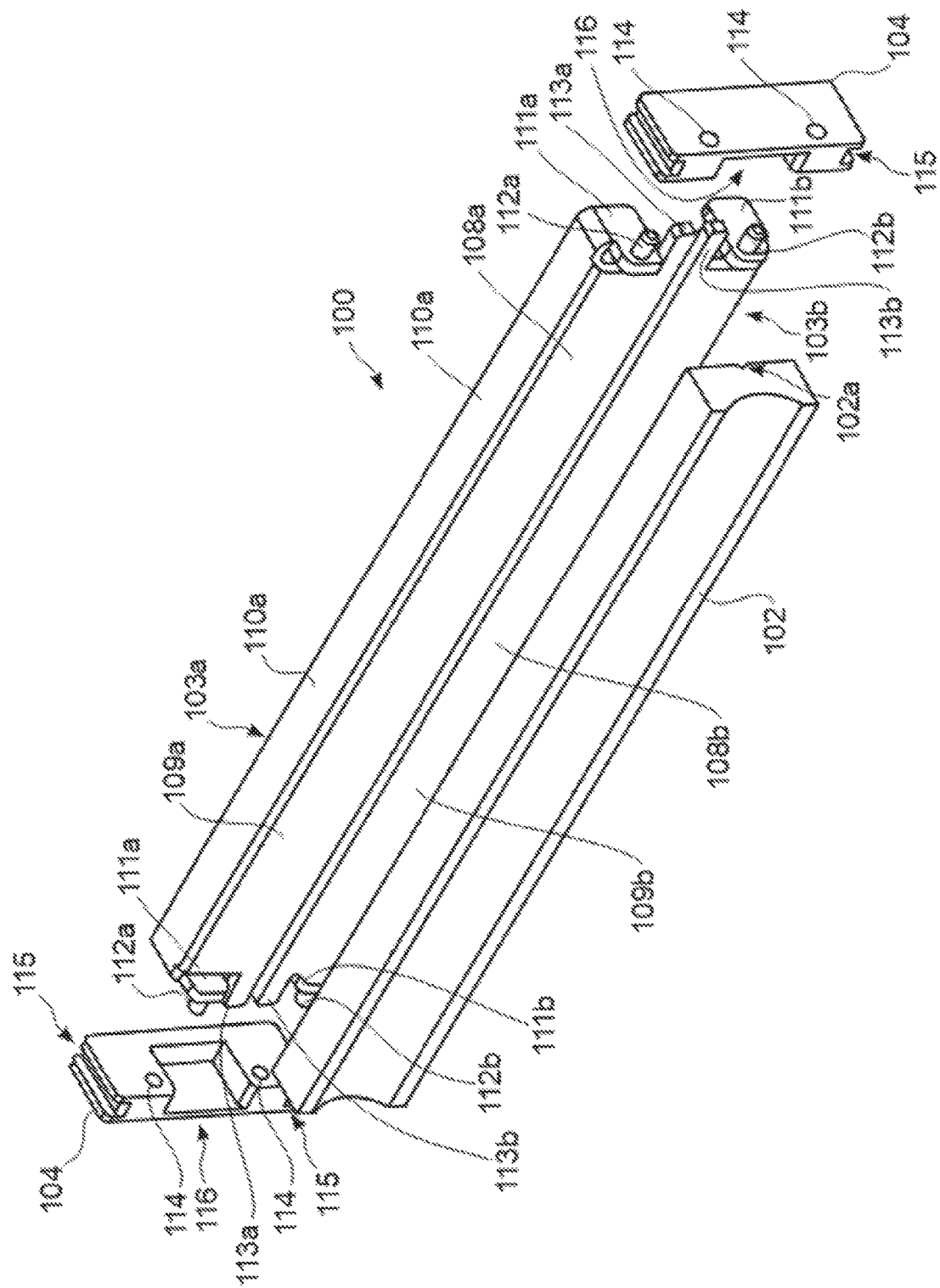
FIG. 4B is a schematic exploded perspective view of a main part of the example lubricant coating device.

FIGS. 3A through 4B are schematic diagrams illustrating the lubricant coating device 100 according to an example of the present disclosure. FIGS. 3A and 3B schematically show the lubricant coating device 100 disposed to apply lubricant to the photosensitive drum 40, FIG. 3A showing a state before the lubricant source 102 is consumed (an initial state), and FIG. 3B showing a state in which the lubricant source 102 is exhausted (or consumed). In addition, FIG. 4A is a perspective view of the example lubricant coating device 100 and FIG. 4B is an exploded perspective view of a main part of the lubricant coating device 100.

As shown in FIGS. 3A, 3B and 4A, the lubricant coating device 100 may include the rotatable supply roller (also referred to as the applicator) 101 to apply lubricant from the lubricant source 102 to the photosensitive drum (also referred to as the member to be coated or the rotating member) 40, a pair of supporting members 103a and 103b forming a supporting device to support the lubricant source 102 in a contact state with the rotatable supply roller 101, guide members 104 supporting the supporting members 103a and 103b in a rotatable manner, division facilitating members 105 facilitating dividing the lubricant source 102, a casing 106 housing the guide members 104 to be guidable in a direction toward the supply roller 101, and an elastic body 107. The elastic body 107 may press the guide member 104 in the direction toward the supply roller 101, so that the contact state of the solid lubricant source 102 with the supply roller 101 can be maintained in a stable manner. Additionally, the guide members 104 supporting the supporting members 103a and 103b in a rotatable manner may inhibit an unintended division of the solid lubricant source at the time of incorporating the solid lubricant source. As one example, the casing 106 may be shaped like a box having an opening and house the lubricant source 102, the supporting members 103a and 103b, the guide members 104, and the elastic body 107. The casing 106 may be, for example, secured to a housing of a unit including the lubricant coating device 100. As one example, the elastic body 107 may be disposed between an inner wall of the casing 106 which faces the opening and the guide member 104 and press the guide member 104 in the direction toward the opening of the casing 106. According to examples, a pressing spring such as a coil spring may be used as the elastic body 107.

The supply roller 101 has a rotatable shaft 101a and an elastic body 101b formed on the circumferential surface of the shaft 101a. Ends of the shaft 101a can be rotatably supported by a bearing member 105' and may be driven to rotate by a driving device not illustrated. The supply roller 101 is driven to rotate in a rotating direction Rb following rotation of the photosensitive drum 40. The elastic body 101b may be formed of a foam (a foam layer). That is, the elastic body 101b can be a sponge-like elastic body. The foam can be, for example, a urethane foam or the like. In addition, the elastic body 101b can also be formed of, for example, napped fibers (rather than the foam), such that the elastic body 101b is a brush-like elastic body, for example. The napped fibers can have flexibility and can be, for example, polyolefin-based resins (for example, polyethylene or polypropylene).

The lubricant source 102 may be disposed to contact the supply roller 101. The lubricant source 102 contacts the elastic body 101b of the supply roller 101, thereby allowing lubricant to be carried on the supply roller 101. The lubricant source 102 may be urged via the supporting members 103a, 103b and the guide members 104 by the elastic body 107 to be pressed against the supply roller 101. This can allow the elastic body 101b of the supply roller 101 to scrape the lubricant and carry fine particles of the lubricant thereon. Then, the supply roller 101 can apply the fine particles of the lubricant carried thereon to a surface 40a of the photosensitive drum 40.

The lubricant source 102 can be, for example, a molded body made by molding lubricant into a predetermined shape (a rod shape, a prismatic shape, a cylindrical shape or the like). The lubricant source 102 can be made of, for example, zinc stearate, barium stearate, lead stearate or the like. In a surface of the lubricant source 102 supported on the supporting members 103a and 103b, a groove 102a parallel with the axis of rotation of the supply roller 101 may be formed. The groove 102a facilitates dividing the lubricant source 102 and may be formed to orient a direction of dividing the lubricant source 102. In some examples, the groove 102a may be formed at a center of the lubricant source 102 and in parallel with the axis of rotation of the supply roller 101, to divide the lubricant source 102 into halves, and the divided halves of the lubricant source 102 are supported respectively on the supporting members 103a and 103b. In this case, the groove 102a may be formed along the full length of the lubricant source 102 in the longitudinal direction or partially along the length of the lubricant source 102.

As shown in FIGS. 5A, 5B and 5C, the groove may have a cross-sectional shape that is triangular 102a, semicircular 102b or rectangular 102c. In addition, a threshold at which the supporting members 103a and 103b may be rotated or the lubricant source 102 may be divided (also referred to as a consumption threshold of the solid lubricant source 102) may be defined by adjusting depths of the grooves 102a through 102c. That is, when a consumption of the lubricant source 102 reaches the grooves 102a through 102c, the lubricant source 102 is divided and the divided pieces of the lubricant source 102 may be supported respectively on the supporting members 103a and 103b. In addition, when the lubricant source 102 is consumed to reach the vicinity of the groove 102a, 102b or 102c, the division of the lubricant source 102 may be facilitated. Accordingly, the supporting angle of the solid lubricant sources 102 can be varied, in response to the consumption of the solid lubricant source 102 relative to the consumption threshold. In another example, the consumption threshold of the solid lubricant source 102 can be determined by a length of the division facilitating members 105. In this case, the groove 102a, 102b, 102c may be omitted.

As shown in FIG. 4B, the supporting member 103a has a supporting plate 108a supporting the lubricant source 102, and has an upper-end portion 110a extending from an upper end of the supporting plate 108a in a direction opposite to, and perpendicularly to a supporting surface 109a supporting the lubricant source 102, side-end portions 111a each extending in the downward direction and perpendicularly from the longitudinal ends of the upper-end portion 110a, rotation rods 112a extending from the respective side-end portions 111a outward in the longitudinal direction of the supporting plate 108a, and abutting portions 113a protruding from a lower end of the supporting plate 108a to extend in the longitudinal direction of the supporting plate 108a. The rotation rods 112a are fitted respectively into holes 114 (described later) formed in the guide members 104 and the supporting member 103a may thereby be rotatably supported between the guide members 104. As the guide member 104 is pressed in the direction toward the supply roller 101 by the elastic body 107, the lubricant source 102 may be urged against the supply roller 101 via the supporting member 103a supported by the guide members 104.

The rotation rod 112a is a rotation center of the supporting member 103a. For example, when the lubricant source 102 is not consumed, the rotation rod 112a may be disposed on an extension, in the longitudinal direction of the supporting surface 109a, of an intersection between the supporting surface 109a and a tangential line of the supply roller 101 perpendicular to this supporting surface 109a. That is, when the lubricant source 102 is not consumed, the axis of rotation of the supporting member 103a may be an axis which passes through the intersection between the supporting surface 109a of the supporting member 103a and the tangential line of the supply roller 101 perpendicular to the supporting surface 109a and which is parallel with the axis of rotation of the supply roller 101. A remnant (or remainder) of the lubricant source 102 can be further reduced by disposing the rotation rod 112a of the supporting member 103a at this position. In another example, the rotation rod 112a may be disposed on an extension, in the longitudinal direction of the supporting surface 109a, of a portion at which an upper end of the lubricant source 102 comes in contact with the supporting surface 109a.

The abutting portion 113a is a portion which a front end of the division facilitating member 105 can abut. When the lubricant source 102 is consumed and the supply roller 101 and the supporting member 103a moves closer in distance, the front end of the division facilitating member 105 may abut the abutting portion 113a. This causes the supporting member 103a to rotate about the rotation rod 112a, for example in response to the consumption of the solid lubricant source relative to the consumption threshold, thereby facilitating dividing the lubricant source 102 when the lubricant source 102 is not divided. Accordingly, the solid lubricant source 102 may be divided into solid lubricant sources 102 so as to vary the respective supporting angles of the solid lubricant sources 102 supported on the supporting members 103a and 103b.

Similarly, the supporting member 103b has a supporting plate 108b supporting the lubricant source 102, and has a lower-end portion 110b extending from a lower end of the supporting plate 108b in a direction opposite to, and perpendicularly to a supporting surface 109b supporting the lubricant source 102, side-end portions 111b each extending in the upward direction and perpendicularly from the longitudinal ends of the lower-end portion 110b, rotation rods 112b extending from the respective side-end portions 111b outward in the longitudinal direction of the supporting plate 108b, and abutting portions 113b protruding from an upper end of the supporting plate 108b to extend in the longitudinal direction of the supporting plate 108b. The rotation rods 112b are fitted respectively into the holes 114 (described later) formed in the guide members 104 and the supporting member 103b may thereby be rotatably supported between the guide members 104. As the guide member 104 is pressed in the direction toward the supply roller 101 by the elastic body 107, the lubricant source 102 may be urged against the supply roller 101 via the supporting member 103b supported by the guide members 104.

The rotation rod 112b provides a rotation center of the supporting member 103b. For example, when the lubricant source 102 is not consumed, the rotation rod 112b may be disposed on an extension, in the longitudinal direction of the supporting surface 109b, of an intersection between the supporting surface 109b and a tangential line of the supply roller 101 perpendicular to this supporting surface 109b. That is, when the lubricant source 102 is not consumed, the axis of rotation of the supporting member 103b may be an axis which passes through the intersection between the supporting surface 109b of the supporting member 103b and the tangential line of the supply roller 101 perpendicular to the supporting surface 109b and which is parallel with the axis of rotation of the supply roller 101. A remnant (or remainder) of the lubricant source 102 can be further reduced by disposing the rotation rod 112b of the supporting member 103b at this position. In another example, the rotation rod 112b may be disposed on an extension, in the longitudinal direction of the supporting surface 109b, of a portion at which a lower end of the lubricant source 102 contacts the supporting surface 109b.

The abutting portion 113b is a portion which the front end of the division facilitating member 105 can abut. When the lubricant source 102 is consumed and the distance between the supply roller 101 and the supporting member 103b shortens, the front end of the division facilitating member 105 may abut the abutting portion 113b. This causes the supporting member 103b to rotate about the rotation rod 112b, thereby facilitating dividing the lubricant source 102 when the lubricant source 102 is not divided.

The supporting members 103a and 103b may be disposed symmetrically as a pair, on both sides of a plane including the axis of rotation of the supply roller 101. For example, the supporting members 103a and 103b may be disposed to substantially face each other such that the rotation rods 112a and 112b are parallel with the axis of rotation of the supply roller 101 and the supporting surfaces 109a and 109b are in the same plane, and the lubricant source 102 may be fixed to these supporting surfaces 109a and 109b with a double-sided tape and the like. The supporting members 103a and 103b can be made of a metal such as stainless steel or a resin (for example, ABS resins). In another example, the number of supporting members can be one or more, and for example, when the number of supporting members are three, one more unrotatable supporting member (not illustrated) may be disposed between the supporting members 103a and 103b.

The guide members 104 may be disposed in a pair facing the side-end portions 111a and 111b of the supporting members 103a and 103b. In the guide members 104, the holes 114 may be formed to to mount the rotation rods 112a and 112b of the supporting members 103a and 103b therethrough. In addition, in each of an upper end and a lower end of the guide member 104, a groove 115 may be formed to guide the guide member 104 in the direction toward the supply roller 101. The casing 106 may be provided with guide members (not illustrated) such as convex portions or rollers corresponding to these grooves 115. In addition, a space 116 may be formed at a center portion of the guide member 104 in order to prevent, when the supporting members 103a and 103b rotate, the abutting portions 113a and 113b from hitting the guide member 104, which may inhibit the rotation. In another example, the casing 106 may be formed with elongated holes (not illustrated) to guide the rotation rods 112a and 112b of the supporting members 103a and 103b in the direction toward the supply roller 101. In this case, the guide members 104 may be omitted.

The division facilitating members 105 may be disposed extending from the bearing members 105' in the direction toward the supporting members 103a and 103b. The division facilitating member 105 may be a member integrated with the bearing member 105'. In another example, the division facilitating member 105 may be disposed in the bearing member 105' as a separate member. In another example, the division facilitating members 105 may be disposed in the casing 106 or the like. A timing when the division of the lubricant source 102 is facilitated or the supporting members 103a and 103b are forced to be rotated may be adjusted by determining the length of the division facilitating members 105 extending in the direction toward the supporting members 103a and 103b. That is, a threshold at which the supporting members 103a and 103b may be rotated or the lubricant source 102 may be divided (also referred to as a consumption threshold of the solid lubricant source 102) may be defined by the length of the division facilitating members 105. Then, when a consumption of the lubricant source 102 reaches this threshold, the supporting members 103a and 103b may be rotated so as to change a supporting angle of the lubricant source 102. Accordingly, accumulated tolerances can be reduced, and the supporting members 103a and 103b can be rotated in response to consumption of the solid lubricant source 102 relative to the consumption threshold. This facilitates dividing the solid lubricant source 102, so as to vary the supporting angles of the respective solid lubricant sources 102 supported on the supporting members 103a and 103b. The consumption threshold of the solid lubricant source 102 can be defined by, for example, a thickness of a center portion of the lubricant source 102, which is a thickness in the direction in which the lubricant source 102 is pressed. More specifically, a time when a thickness of a residual of the center portion of the lubricant source 102 is 0 mm may be the consumption threshold of the lubricant source 102. For example, when a distance L between a plane passing through the axis of the application roller 101 and perpendicular to the direction in which the lubricant source 102 is pressed and the front ends of the division facilitating members 105 extending in the direction toward the supporting members 103a and 103b is set to be the sum of the radius of the application roller 101 and an initial thickness of the center portion of the lubricant source 102, a timing when the center portion of the lubricant source 102 is just consumed can be set as the consumption threshold of the lubricant source 102. This consumption threshold of the solid lubricant source 102 may be, in addition to a time when the lubricant source 102 is consumed up to a plane on the opposite side of a surface made in contact with the supply roller 101, a time when the lubricant source 102 is consumed as far as the vicinity of the plane on the opposite side of the surface made in contact with the supply roller 101. In another example, a depth of the groove 102a of the lubricant source 102 is determined and a time when the lubricant source 102 is consumed to the groove 102a may be defined as the consumption threshold of the lubricant source 102. In this case, the division facilitating members 105 may be omitted.

Figure 6A:
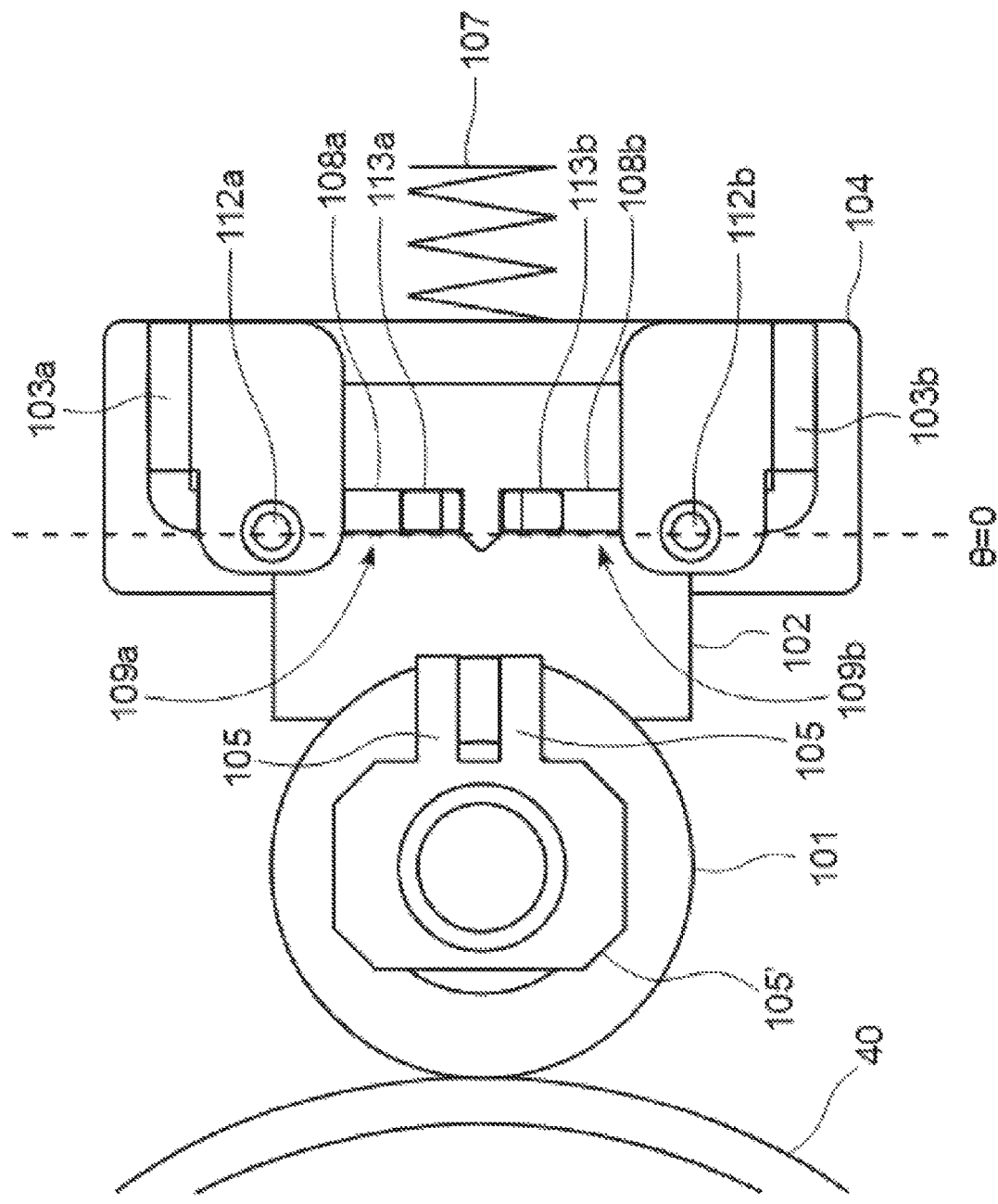
FIG. 6A is a schematic side view of the example lubricant coating device, illustrating an example state before the lubricant is consumed.
Figure 6B:
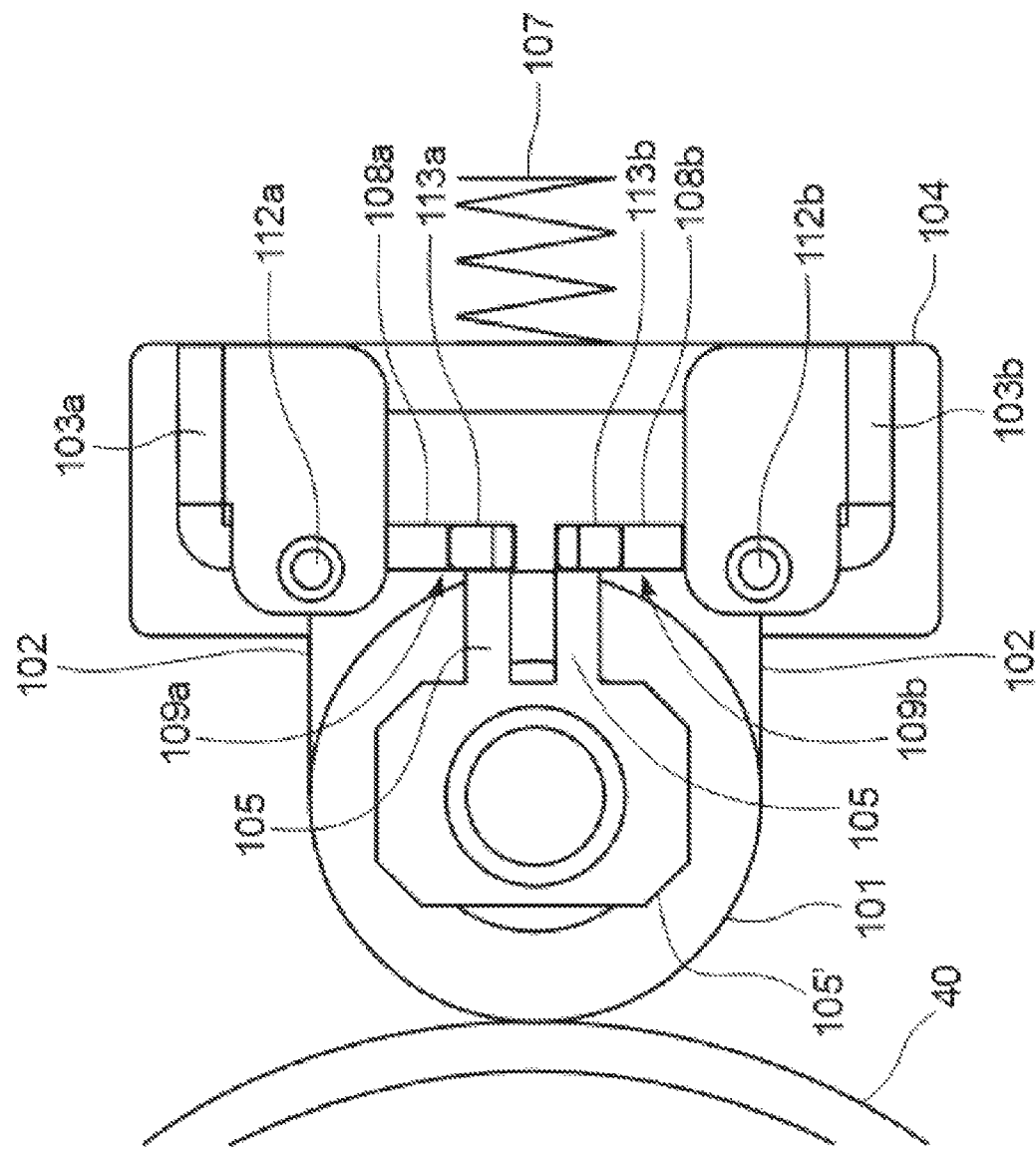
FIG. 6B is a schematic side view of the example lubricant coating device, illustrating an example state in which front ends of a division facilitating member abut abutting portions of supporting members.
Figure 6C:
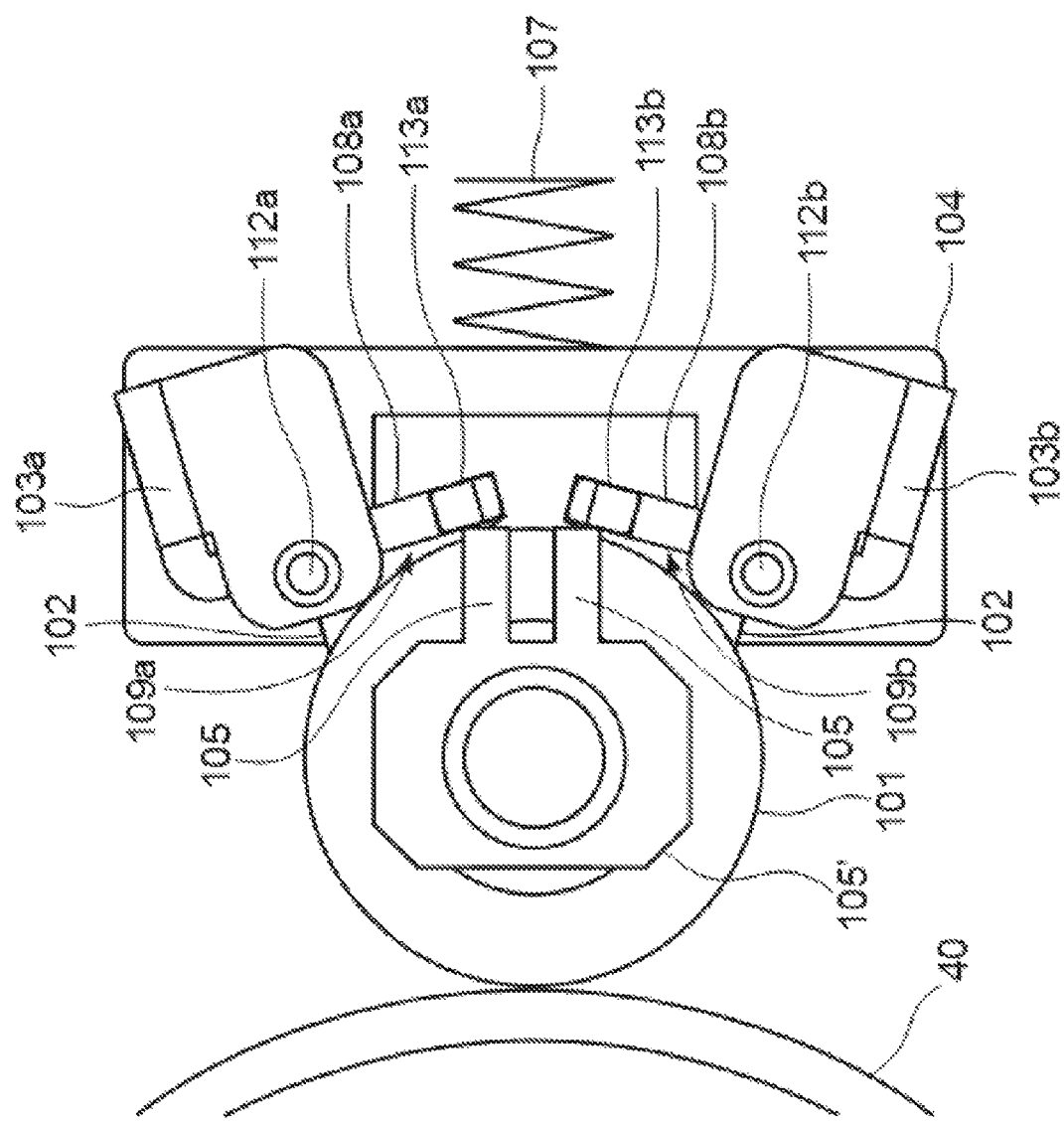
FIG. 6C is a schematic side view of the example lubricant coating device, illustrating an example state in which the supporting members are rotated.
Figure 6D:
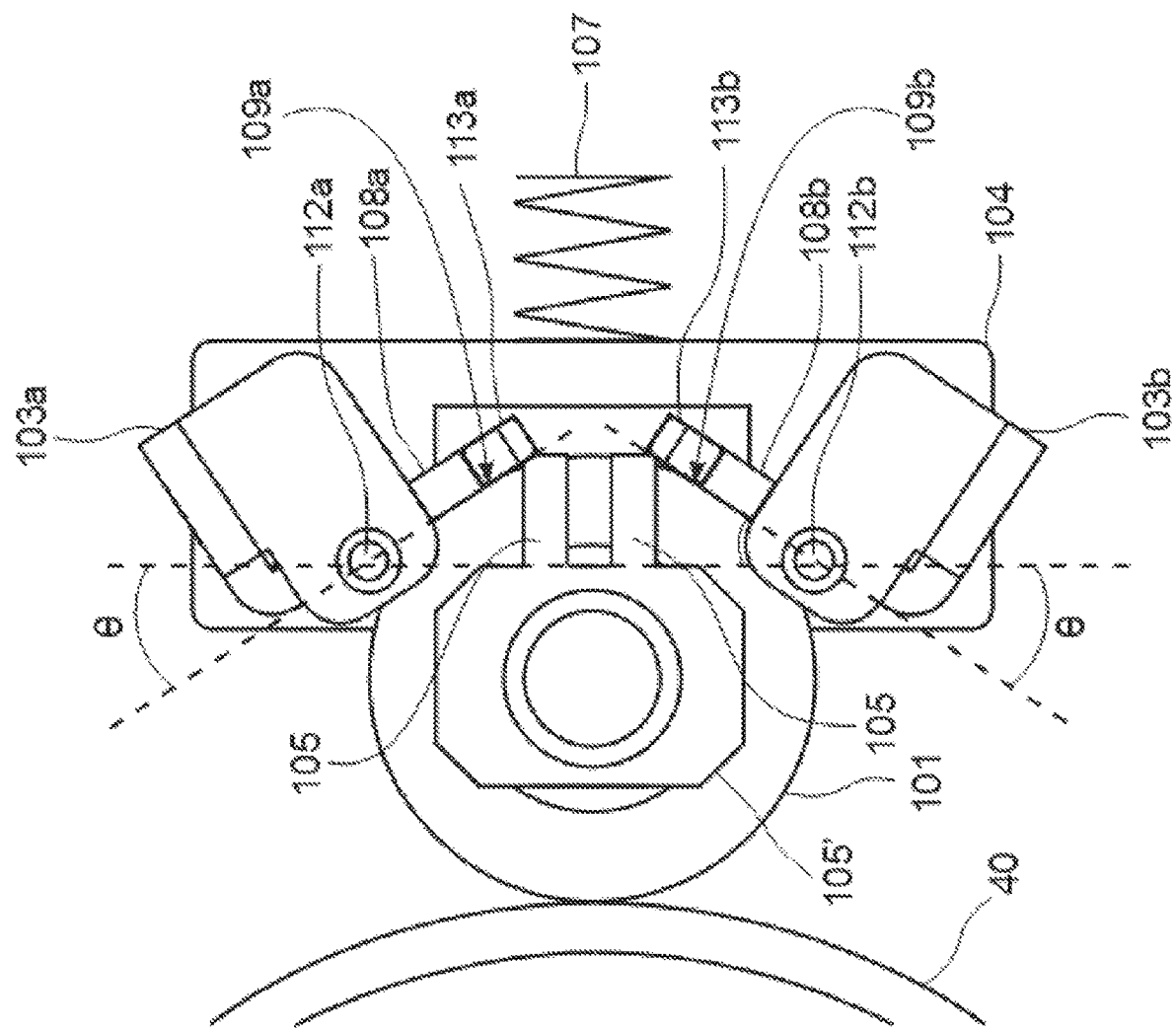
FIG. 6D is a schematic side view of the example lubricant coating device, illustrating an example state after the lubricant source is consumed.

FIGS. 6A, 6B, 6C and 6D are diagrams schematically showing states of the lubricant coating device 100 based on a consumption of the lubricant source 102. FIG. 6A shows a state before the lubricant source 102 is consumed, and FIG. 6B is a diagram showing a state in which the lubricant source 102 is consumed and the front ends of the division facilitating members 105 abut the abutting portions 113a and 113b of the supporting members 103a and 103b. FIG. 6C is a diagram showing a state in which the supporting members 103a and 103b are rotated, and FIG. 6D is a diagram showing a state in which the lubricant source 102 is substantially entirely consumed.

As shown in FIG. 6A, the supporting members 103a and 103b are supported by the guide members 104 such that the supporting surfaces 109a and 109b are in the same plane. The supporting members 103a and 103b may be supported such that the supporting surfaces 109a and 109b are perpendicular to the pressing direction of the lubricant source 102. Since the guide member 104 is pressed in the direction toward the supply roller 101 by the elastic body 107, the supporting members 103a and 103b supported by the guide members 104 are pressed in the direction toward the supply roller 101. This allows the lubricant source 102 to be supported on the supporting members 103a and 103b in a contact state with the supply roller 101. Here, angles of the supporting surfaces 109a and 109b relative to a plane including the rotation rods 112a and 112b of the supporting members 103a and 103b (that is, a plane perpendicular to the pressing direction of the lubricant source 102) are assumed to be rotation angles θ of the supporting members 103a and 103b. In a state before the lubricant source 102 is consumed, the rotation angles θ of the supporting members 103a and 103b are 0°.

As shown in FIG. 6B, when the lubricant source 102 is consumed and the supply roller 101 and the supporting members 103a and 103b thereby move closer in distance, the front ends of the division facilitating members 105 abut the abutting portions 113a and 113b of the supporting members 103a and 103b. This forces the supporting members 103a and 103b to be rotated, thereby facilitating dividing the lubricant source 102 when the lubricant source 102 is not divided. Note that the lubricant source 102 may be divided when consumed up to the groove 102a of the lubricant source 102 or by a pressing force from the supporting members 103a and 103b. In this state, there still remains a significant amount of remnant (or remainder) of the lubricant source 102 in upper and lower portions of the lubricant source 102.

As shown in FIG. 6C, the supporting members 103a and 103b are rotated, thereby pressing the remainder present in the upper or lower portion of the lubricant source 102 in the direction toward the supply roller 101. In this case, the rotation angles θ of the supporting members 103a and 103b will be changed in response to a consumption of the lubricant source 102. The supporting members 103a and 103b are rotated in opposite directions. In this manner, by changing the pressing angle of the lubricant source 102 relative to the supply roller 101, portions which would otherwise remain as unscraped remainder (or remnants) can be made to contact the supply roller 101 and scraped.

As shown in FIG. 6D, the lubricant source 102 is consumed by the rotating operation of the supply roller 101 and finally, the lubricant source 102 is exhausted or substantially entirely consumed. The abutting portions 113a, 113b of the supporting members 103a and 103b and the like are made to abut an inner wall of the guide member 104 (for example, the wall surface of the space 116), so that the rotation angles θ of the supporting members 103a and 103b after the lubricant source 102 is consumed can be defined to be a predetermined angle.

When the lubricant source 102 is exhausted or substantially entirely consumed, the lubricant source 102, the lubricant coating device 100, or a unit including the lubricant coating device 100 is to be replaced by a service engineer or the like. Thus, in the imaging apparatus 1, sensing of a residual amount of the lubricant source 102 or the like is performed. For example, a consumption of the lubricant source 102 can be predicted or estimated based on a distance (running distance) by which the surface of the supply roller 101 moves.

Figure 7C:
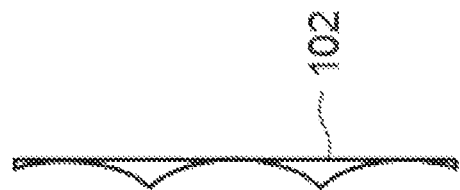
FIG. 7C is a cross-sectional view of the solid lubricant source illustrating a third consumption state.
Figure 7B:
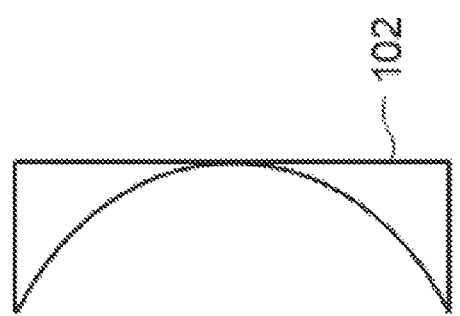
FIG. 7B is a cross-sectional view of the solid lubricant source illustrating a second consumption state.
Figure 7A:
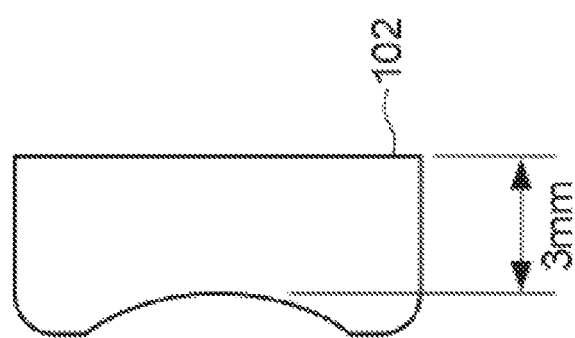
FIG. 7A is a cross-sectional view of the solid lubricant source illustrating a first consumption state.
Figure 8:
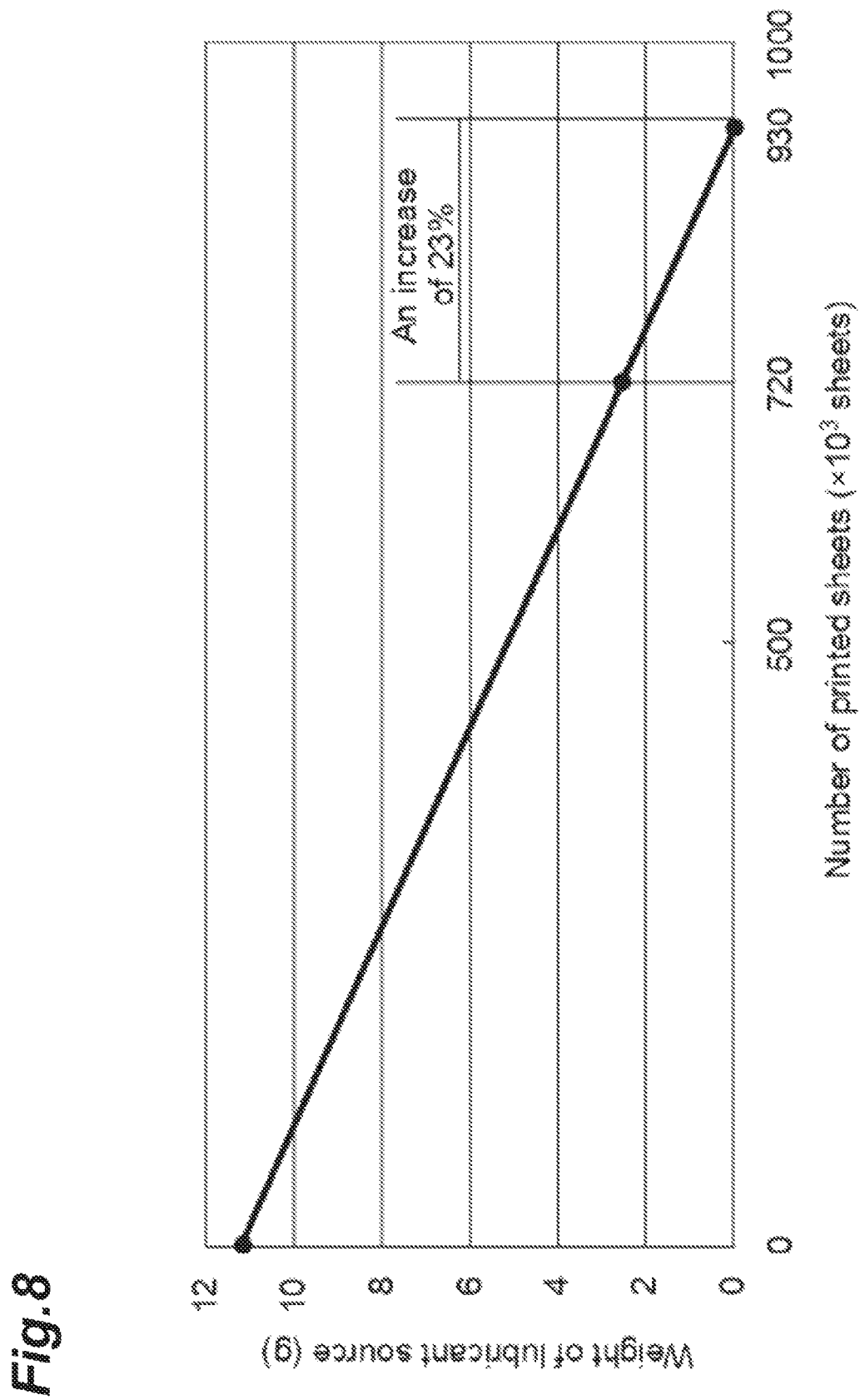
FIG. 8 is a plot indicating a relationship between the number of printed sheets and the weight of the lubricant source.

With reference to FIGS. 7A, 7B, 7C and 8, effect of reducing an amount of remnant (or remainder) of the lubricant by the lubricant coating device 100 will be described. FIG. 7 is a cross-sectional view showing a shape of the lubricant source 102 before consumption or after consumption, and FIG. 8 is a plot indicating a relationship between the number of printed sheets and the weight of the lubricant source.

As shown in FIG. 7A, a thickness of a center portion of an initial lubricant source 102 was 3 mm and a weight was 11.2 g. In the case where the supporting members 103a and 103b do not rotate (that is, in the case where the lubricant source 102 is supported on one supporting member), when the center portion of the lubricant source 102 is consumed as shown in FIG. 7B, it is determined to be the end of a life of the lubricant source 102. At this time, a remainder amount of the lubricant source 102 was 2.6 g and a remainder proportion of the lubricant was 23%. The remainder proportion of the lubricant is a proportion of a remainder amount of the lubricant source 102 after consumption to an initial weight of the lubricant source 102.

As shown in FIG. 7C, in the case where the supporting angles of the lubricant source 102 were changed by the supporting members 103a and 103b in response to consumption thereof, the weight of the lubricant source 102 and the remainder proportion of the lubricant when the lubricant source 102 was determined to reach the end of its life were 0.3 g and 0.03%, respectively.

As shown in FIG. 8, in the case where the supporting angle of the lubricant source 102 was not changed, the life was ended when about $720 \times 10^3$ sheets of paper were printed. In contrast, even when a lubricant source 102 of the same size was used, the lubricant coating device 100 according to the present disclosure was capable of printing about $930 \times 10^3$ sheets of paper. That is, even when the weight and shape of the lubricant source 102 were the same, the life was extended as much as 23%.

As mentioned above, the lubricant coating device according to the present disclosure can reduce a remnant (remainder) of the solid lubricant source by changing the supporting angle of the solid lubricant source relative to the supply roller in response to a consumption of the solid lubricant source to the consumption threshold. That is, when the solid lubricant source is consumed and the residual amount decreases, the solid lubricant source is divided to change the supporting angle thereof so that the remnant (remainder) of the solid lubricant source can be reduced. Thus, when a solid lubricant source of the same size is used, a life of the solid lubricant source can be prolonged. In addition, the solid lubricant source can be reduced in size to match the lifespan of larger solid lubricant sources currently available, and the lubricant coating device can thus be downsized.

The invention claimed is:

1. A lubricant coating device comprising:
   a rotatable applicator to apply lubricant from a solid lubricant source to a member to be coated; and
   a pair of supporting members to support the solid lubricant source in a contact state with the rotatable applicator and to change a supporting angle of the solid lubricant source relative to the rotatable applicator based on a consumption of the solid lubricant source, wherein the pair of supporting members are disposed symmetrically relative to a plane intersecting an axis of rotation of the rotatable applicator, wherein the pair of supporting members comprises two supporting plates to support the solid lubricant source, the supporting plates to rotate in opposite directions about respective axes of rotation that are parallel with the axis of rotation of the rotatable applicator, based on the consumption of the solid lubricant source, to support the solid lubricant source on the supporting plates.

2. The lubricant coating device according to claim 1, comprising a guide member to guide the pair of supporting members in a direction toward the rotatable applicator based on the consumption of the solid lubricant source, wherein the pair of supporting members are rotatably supported by the guide member.

3. The lubricant coating device according to claim 2, comprising a casing to house the guide member to be guidable in a direction toward the rotatable applicator.

4. The lubricant coating device according to claim 2,
   wherein each supporting member of the pair of the supporting members has a rotation rod which extends in parallel with an axis of rotation of the rotatable applicator, and
   wherein the guide member includes respective holes in which the rotation rod of each supporting member of the pair of the supporting members is disposed.

5. The lubricant coating device according to claim 1, comprising a division facilitating member to facilitate dividing the solid lubricant source supported on the pair of supporting members by abutting the pair of supporting members to rotate the pair of supporting members.

6. The lubricant coating device according to claim 5, wherein the division facilitating member is disposed in a bearing of the rotatable applicator.

7. The lubricant coating device according to claim 6,
   wherein each supporting member of the pair of the supporting members is to move in a direction toward the rotatable applicator based on the consumption of the solid lubricant source,
   wherein the division facilitating member extends from the bearing of the rotatable applicator in a direction toward the pair of supporting members, and
   wherein the division facilitating member includes an end portion to abut the pair of supporting members to cause each supporting member of the pair of supporting members to rotate.

8. A lubricant coating device comprising:
   a rotatable applicator to apply lubricant from a solid lubricant source to a member to be coated; and
   a pair of supporting members to support the solid lubricant source in a contact state with the rotatable applicator and to change a supporting angle of the solid lubricant source relative to the rotatable applicator based on a consumption of the solid lubricant source, wherein the solid lubricant source includes a groove to facilitate dividing the solid lubricant source.

9. The lubricant coating device according to claim 8, wherein a cross sectional shape of the groove is semicircular or polygonal.

10. The lubricant coating device according to claim 8, wherein the groove extends in parallel with an axis of rotation of the rotatable applicator.

11. The lubricant coating device according to claim 8, wherein the pair of supporting members are located on opposite sides of the groove.

12. An imaging apparatus comprising a lubricant coating device, wherein the lubricant coating device comprises:
   a rotatable applicator to apply lubricant from a solid lubricant source to a member to be coated;
   a pair of supporting members to support the solid lubricant source in a contact state with the rotatable applicator and to change a supporting angle of the solid lubricant source relative to the rotatable applicator based on a consumption of the solid lubricant source; and
   a division facilitating member to facilitate dividing the solid lubricant source supported on the pair of supporting members by abutting the pair of supporting members to rotate the pair of supporting members.

13. The imaging apparatus according to claim 12, wherein the division facilitating member is disposed in a bearing of the rotatable applicator.

14. The imaging apparatus according to claim 13,
   wherein each supporting member of the pair of the supporting members is to move in a direction toward the rotatable applicator based on the consumption of the solid lubricant source,
   wherein the division facilitating member extends from the bearing of the rotatable applicator in a direction toward the pair of supporting members, and
   wherein the division facilitating member includes an end portion to abut the pair of supporting members to cause each supporting member of the pair of supporting members to rotate.

15. The imaging apparatus according to claim 12, wherein the solid lubricant source includes a groove to facilitate dividing the solid lubricant source.

16. The imaging apparatus according to claim 15, wherein a cross sectional shape of the groove is semicircular or polygonal.

17. The imaging apparatus according to claim 15, wherein the groove extends in parallel with an axis of rotation of the rotatable applicator.

* * * * *